United States Patent
Canale

[15] 3,660,976
[45] May 9, 1972

[54] TURBINE ENGINE CYCLE TEMPERATURE CONTROL SYSTEM

[72] Inventor: Raymond P. Canale, Warren, Mich.

[73] Assignee: Holley Carburetor Company, Warren, Mich.

[22] Filed: Apr. 20, 1970

[21] Appl. No.: 29,864

[52] U.S. Cl. ........................... 60/39.16, 192/.075, 192/.096, 60/39.28
[51] Int. Cl. ............................................................ F02c 7/02
[58] Field of Search .............. 60/39.16, 39.74, 39.14, 39.09; 251/61.4, 61.5, 61.3, 61.2; 60/39.28 T

[56] References Cited

UNITED STATES PATENTS

| | | |
|---|---|---|
| 3,433,319 | 3/1969 | McLean............................60/39.16 X |
| 2,929,201 | 3/1960 | Lindsey............................60/39.74 X |
| 3,432,152 | 3/1969 | Sweeney.........................251/61.4 UX |
| 3,469,395 | 9/1969 | Spitsbergen....................60/39.14 X |
| 2,568,226 | 9/1951 | Drake.............................251/61.5 X |
| 3,158,998 | 12/1964 | Robinson........................60/39.74 X |
| 3,240,013 | 3/1966 | Spath...................................60/39.09 |
| 3,376,702 | 4/1968 | McLean..........................60/39.16 X |

Primary Examiner—Clarence R. Gordon
Attorney—Walter Potoroka, Sr.

[57] ABSTRACT

A turbine engine, provided with a fuel control, has a gasifier section and a free turbine power section with energizeable clutching means adapted for at least at times causing frictional engagement between the sections in order to vary the then existing temperature within a selected point of the engine to cause that temperature to change to a value consistent with prescribed limits for that temperature.

13 Claims, 8 Drawing Figures

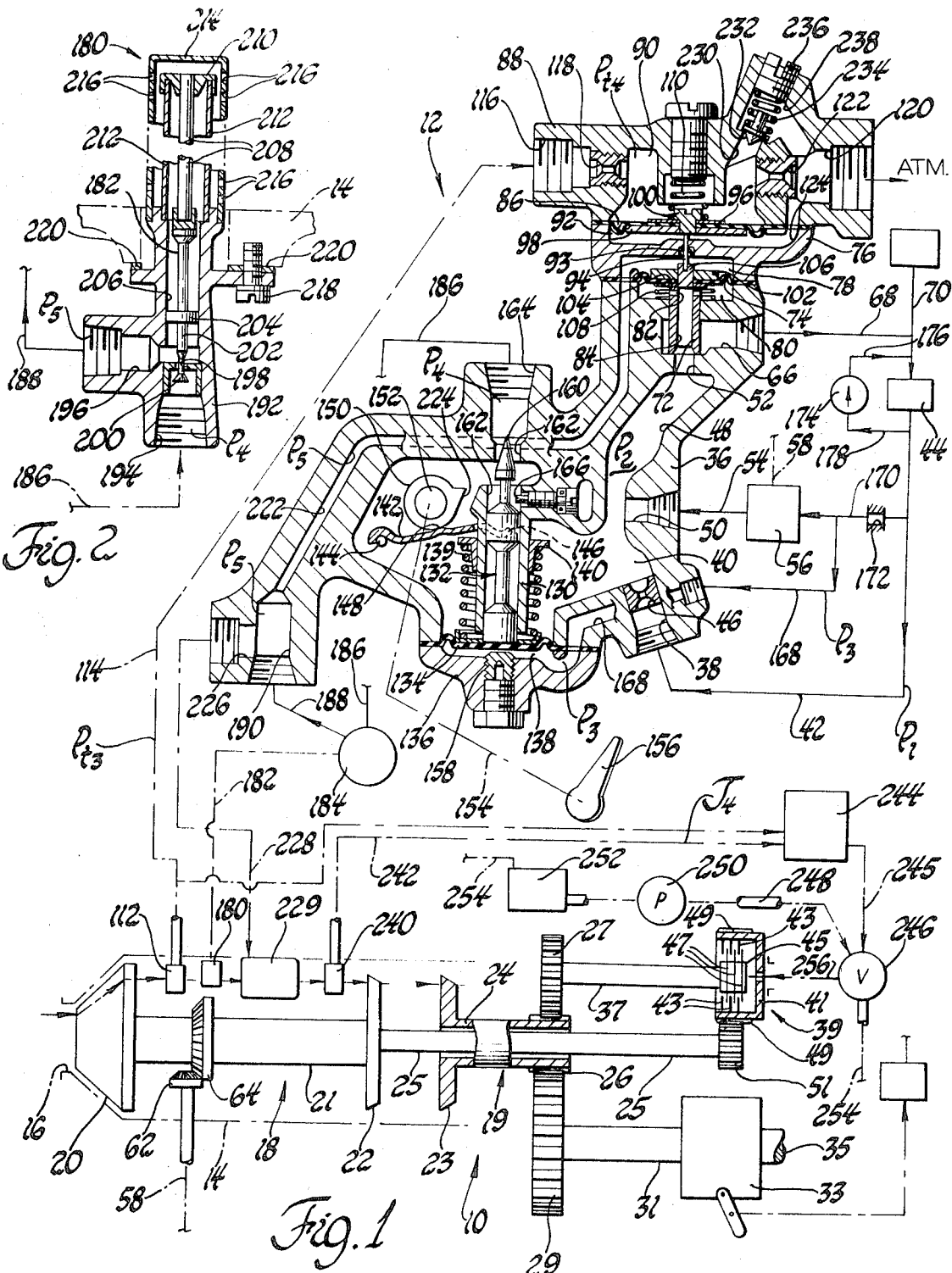

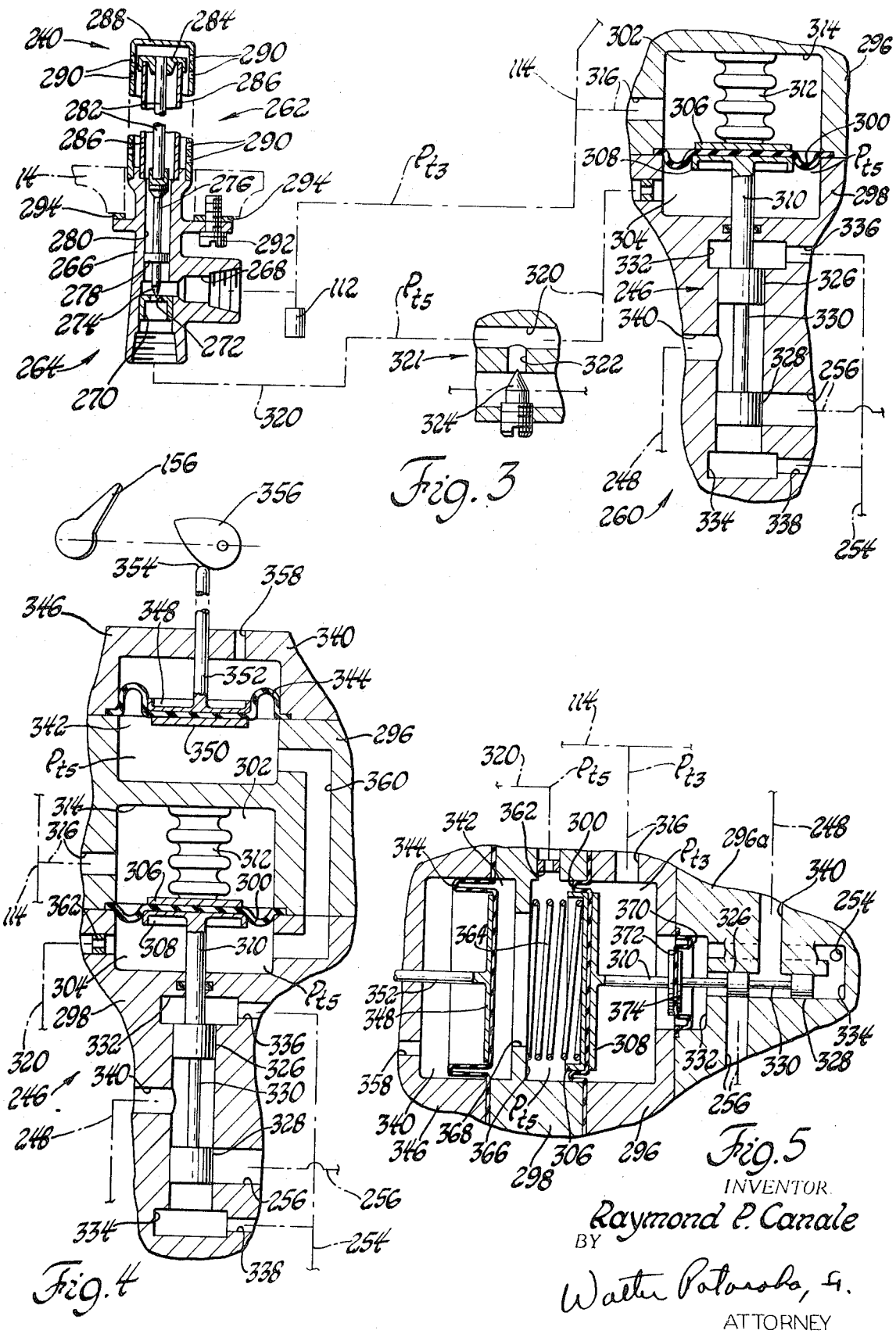

INVENTOR.
Raymond P. Canale
BY
Walter Potoroka, Jr.
ATTORNEY

TURBINE ENGINE CYCLE TEMPERATURE CONTROL SYSTEM

BACKGROUND OF THE INVENTION

Gas turbine engines may be classified broadly into three groups such as (1) turbojet, (2) turboprop and (3) turboshaft. The turbojet engine is one which relies upon jet thrust to develop its propulsive force, whereas, a turboprop has its engine shaft coupled to a propeller, so as to develop its propulsive force by slightly increasing the velocity of a large mass of air. The turboshaft engine differs from the turboprop in that the turbine shaft is coupled to an output shaft which might drive something other than a propeller. Such output shaft may, for example, be a drive shaft for a land based vehicle such as a truck or a stationary power plant.

Regardless of the type of engine, it has been discovered that best efficiency for a gas turbine engine is attained when certain cycle temperatures are maintained within prescribed accurate limits.

Accordingly, the invention as herein disclosed and claimed is concerned with the provision of means whereby such selected cycle temperatures may be controlled during engine operation.

SUMMARY OF THE INVENTION

According to the invention, a cycle temperature control system for a turbine engine having a gasifier section, comprises first means for sensing a selected cycle temperature within said turbine engine and for producing a first signal of a variable magnitude in accordance with the magnitude of said cycle temperature, second means effective to at times operatively engage said gasifier section in order to at least partially retard the rotation of said gasifier section, and third control means for receiving said first signal, said third control means being effective whenever the magnitude of said first signal in less than a first predetermined magnitude to cause actuation of said second means in order to retard rotation of said gasifier section.

Various objects and advantages of the invention will become apparent when reference is made to the following detailed description considered in conjunction with the accompanying drawings.

DESCRIPTION OF THE DRAWINGS

In the drawings, wherein certain details or elements may be omitted from one or more views for purposes of clarity:

FIG. 1, illustrates a turbine engine, provided with a fuel control, and embodying the temperature control system of the invention;

FIG. 2, is an enlarged axial cross-sectional view of one of the elements diagrammatically shown in FIG. 1;

FIGS. 3, 4, 5 and 6 are views respectively illustrating other embodiments and modifications of the invention;

DESCRIPTION OF THE PREFERRED EMBODIMENTS

Figure 6:
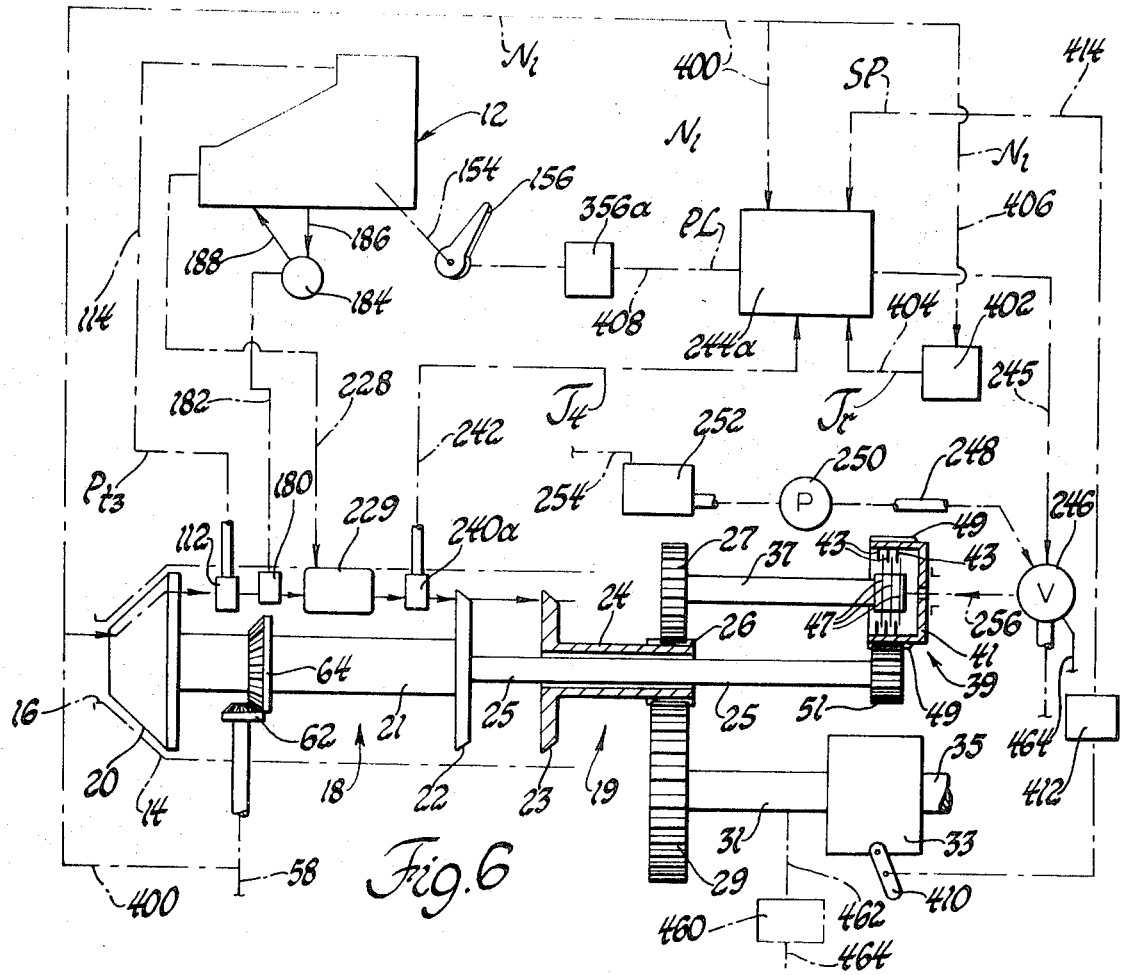

Referring now in greater detail to the drawings, FIG. 1 illustrates a free turbine type of engine 10 whose fuel supply is controlled as by a scheduling type of fuel control 12. The engine 10 is illustrated, somewhat schematically, as being comprised of an outer housing 14, provided with a suitable air inlet 16, containing a gas producer or gasifier section 18 and a power output or free turbine section 19.

The gas producer section 18 is comprised of a compressor 20 operatively connected, as by a shaft 21, to a compressor turbine wheel 22 which, as is well known in the art, serves to drive the compressor 20. The free turbine section 19 may be comprised of a power turbine wheel 23 suitably mounted as on a hollow shaft 24, journalled within the engine 10, through which a shaft extension 25, connected to the gasifier section 18, freely passes.

As shown, the right end of hollow shaft 24 may have provided thereon a gear 26 which is in meshed engagement with a first gear 27 and a second output gear 29 having a shaft 31 connected thereto and functioning as an input shaft to, for example, a power transmission assembly 33 which, in turn, may have a suitable output shaft 35.

Gear 27 is operatively connected to a shaft 37 which, at its other end, is connected to a suitable clutching mechanism 39 generally comprised of a rotatable outer housing 41 having one or more clutch plates 43 secured therewithin and an inner disposed body 45 carrying one or more clutch plates 47 arranged so as to be engageable with clutch plates 43. The outer portion of housing 41 carries a gear portion 49 meshed with a gear 51 secured to the end of shaft extension 25. The clutch assembly 39 is illustrated only to the detail deemed necessary to convey the teachings of the invention and the precise construction thereof is not important since, as will become apparent, the invention may be practiced by various braking or clutching mechanisms well known in the art. However, for purposes of discussion, it will be assumed that the clutching mechanism 39 is one which is actuated hydraulically; that is, as increased hydraulic pressure is directed to the interior of outer housing 41 the clutch plates 43 and 47 are urged toward or against each other with an increasing force so as to frictionally form at least a degree of drive connection therethrough.

The turbine engine 10, of course, could be employed as a land-based stationary power plant, one employed in combination with either a land or water vehicle, as well as being employed as an aircraft power plant.

The fuel control 12, having a housing 36, is illustrated as comprising a fuel inlet conduit 38 which communicates generally between a general cavity or chamber 40, within housing 36, and a fuel supply conduit 42 communicating with a fuel pump 44. Inlet conduit 38, is provided with a restriction 46 the purpose of which will become apparent as the description progresses. Alternatively, a so-called "muscles" valve, which is well known in the art, may be employed in place of restriction 46.

Cavity or chamber 40 communicates with a passageway 48 which, in turn, communicates with conduits 50 and 52. Conduit 50 communicates, as by conduit means 54, with speed sense means 56 operatively connected as by suitable motion transmission means 58 to the shaft 21 as by means of meshed gears 62 and 64 of which 64 is connected to the shaft 21 and compressor 24 for rotation therewith.

Conduit 52 is in controlled communication with a bypass conduit 66 leading, as by suitable conduit means 68, to conduit means 70 upstream of the fuel pump 44. A bypass valve 72 operatively connected to a pressure responsive diaphragm assembly 74 is, as will become evident, normally urged downwardly toward a position closing communication between conduits 52 and 66. Diaphragm assembly 74 may be suitably retained between housing 36 and housing portion 76 so as to form two generally distinct but variably chambers 78 and 80. As will be noted, bypass valve 72 is provided with a plurality of radial passages 82 which continually complete communication between the interior 84 of bypass valve 72 and chamber 80.

A second diaphragm assembly 86 suitably secured between first housing portion 76 and a second housing portion 88, so as to form two generally distinct but variable chambers 90 and 92, is operatively connected to a motion transmitting pushrod 94 which is slidably received through a wall of housing portion 76 so as to have its opposite ends generally received within chambers 92 and 78.

As can be seen, the diaphragm assembly 86 may include oppositely disposed diaphragm backing plates 96 and 98 which may be secured to each other, as to contain the diaphragm therebetween, by a suitable fastener 100 passing therethrough. Similarly, diaphragm assembly 74 may be provided with oppositely disposed diaphragm backing plates 102 and 104 which also may be secured to each other, as to contain the diaphragm therebetween, by a suitable fastener 106, which may be formed at one end of valve 72, passing therethrough. If desired, fastener 106 may be provided with a bore for receiving therein one end of pushrod 94. A compression spring 108, situated within chamber 80 normally resiliently urges the diaphragm assembly 74 upwardly while a compression spring 110 within chamber 90 resiliently urges the diaphragm assembly 86 downwardly thereby causing the pushrod 94 to be in abutting engagement at one end with the diaphragm assembly 74 and valve 72 and, at the other end, with diaphragm assembly 86. (As specifically illustrated, the motion or force transmitting pushrod 94 may actually abut against the fastner portions 100 and 106 of diaphragm assemblies 86 and 74, respectively.)

Compressor discharge or burner inlet pressure, $P_{t3}$, sensed as by a probe 112 is directed to chamber 90 as by conduit means 114 and 116 and a restriction 118 in series therewith. Chamber 90, containing compression spring 110, normally urging diaphragm assembly 86 downwardly, communicates with the ambient atmosphere by means of a conduit 120 which also contains a restriction 122. Because of the flow afforded by the combination of restrictions 118 and 122 the pressure, $P_{t4}$, within chamber 90, although related to the value of $P_{t3}$, will be of a value somewhat less than the value of $P_{t3}$. For example, restrictions 118 and 122 may be designed so that $$P_{t4} \cong K \frac{2}{P_{t3}}$$

, as is the case in Applicant's disclosed structure. Chamber 92 communicates with the ambient atmosphere as by means of a conduit 124 which communicates with conduit 120 downstream of restriction 122.

Chamber or cavity 40 has a cylindrical valve-guide portion 130 for slideably receiving therein a governor valve 132 suitably secured as at one end to a third pressure responsive diaphragm assembly 134 which may be suitably secured between housing 36 and cover member 136 in a manner forming a chamber 138 between the diaphragm assembly 134 and cover 136. A flanged sleeve-like variably positioned spring seat 140 is situated generally about the cylindrical valve-guide 130 in a manner so as to contain a compression spring 139 between seat 140 and diaphragm assembly 134. A lever 142, generally hinged as at 144, has a bifurcated end 146 which is adapted to straddle guide 130 in order to engage the upper surface of spring seat 140. Intermediate to the ends thereof, lever 142 is provided with a cam-follower portion 148 adapted to engage the cam surface of a cam member 150 mounted on a shaft 152 for rotation therewith. As diagrammatically illustrated at 154, shaft 152 is operatively connected to a power selector lever 156 so that, for example, clockwise rotation of power lever 156 will cause corresponding rotation of shaft 152 and cam 150 thereby rotating lever 142 clockwise about pivot 144 is order to urge spring seat 140 downwardly thereby increasing the loading of compression spring 139. Such loading of spring 139, of course, urges diaphragm assembly 134 and governor valve 132, connected thereto, in the downward direction. A threadably adjustable stop 158 may be provided for limiting the degree of downward movement of diaphragm assembly 134 and governor valve 132.

Chamber 138, on the other side of diaphragm assembly 134, communicates as by a conduit 168 with a conduit 170 which communicates generally between speed sense 56 and fuel supply conduit 42. As will be noted, conduit 170 contains a restriction 172 and conduit 168 communicates with conduit 170 at a point downstream of restriction 172.

The purpose of speed sense 56, in the embodiment disclosed, is to provide a pressure signal indicative of the speed of the gas producer section 18 (compressor 20 and compressor drive turbine 22). One embodiment of the invention was successfully tested and operated employing a speed sense functionally equivalent to the speed sense as shown, for example, at "140" in U.S. Pat. No. 3,073,115 issued Jan. 15, 1963, to Warren H. Cowles et al. In such an arrangement, restriction 172 would be functionally equivalent to the restriction shown at "242" of said U.S. Pat. No. 3,073,115. Such arrangements and their operations are at this time generally well known in the art. It might also be pointed out at this time that pump 44 is provided with either an externally or internally formed pressure relief and check valve assembly as shown at 174 with suitable associated conduitry 176 and 178 communicating with valve 174 and respectively with conduits 70 and 42.

As shown in FIGS. 1 and 2, means may be provided for enabling the employment of some other control parameter, such as burner inlet temperature, for further qualifying the metered fuel flow to the engine. As schematically illustrated at 182, to a valve assembly 184 which is serially connected between conduit 186, leading from conduit 164, and conduit 188 leading to conduit 190. Generally, the valve assembly 184 functions in a manner whereby a reduction in flow through the valve assembly 184 is experienced as probe 180 senses an increase in temperature.

FIG. 2 illustrates in greater detail one embodiment of a probe 180 and valve assembly 184 suitable for use in the arrangement of FIG. 1. Valve assembly 184 is illustrated as being comprised of a housing 192 having an inlet conduit 194 and an outlet conduit 196 generally between which is situated a valve orifice and seat 198. A valve member 200, carried as at the end of a stem portion 202, is situated so as to vary the effective area of orifice 198 depending on the relative proximity of the valve member 200. Stem 202, provided with a shoulder-like pile portion 204 slideably received within a cylindrical guide-way 206 formed in housing 192, has its opposite end operatively secured to one end of a temperature sensing rod 208. The other end of rod 208 is secured to an end cap member 210 which cooperates with a recessed portion of housing 192 to axially contain therebetween a second temperature sensing member 212 of cylindrical configuration. Cylinder 212 and rod 208 have different coeficients of thermal expension resulting in a predictable axial movement of valve member 200 per degree of temperature variation. The temperature probe 180 is also preferably provided with a protective shroud 214, which is perorated as at 216, in order to protect the rod 208 and cylinder 212 from possible damage. The entire assembly may be secured to the housing 14 of engine 10 by any suitable means such as the fastener and seal respectively illustrated at 218 and 220.

OPERATION OF THE FUEL CONTROL

Fuel at a pressure $P_1$ is supplied by pump 44 through conduit 42 to conduit 38 and through muscles restriction 46 situated within conduit 38. An accompanying drop in pressure across restriction 46 results in the fuel within chamber 40 being at same pressure $P_2$ which is less than $P_1$. Further, it can be seen that conduit 168 supplied fuel from conduit 170 to chamber 138 at a pressure $P_3$ which is usually less than pressure $P_1$. However, it should be apparent that as the speed sense 56 senses greater gasifier section speeds, the throttling valve contained therein becomes more nearly closed, resulting in the differential pressure $P_3-P_2$ increasing in magnitude. The ultimate maximum value of pressure $P_3$ would, of course, be pressure $P_1$ upstream of restriction 172. A further pressure drop occurs with the passage of fuel through the aperture defined by orifice 162 and metering valve 160, so that metered fuel downstream of orifice 162 is at a pressure $P_4$. A second pressure drop occurs with the passage of fuel through the aperture defined by orifice 198 and valve 200 so that the metered fuel downstream of orifice 198 is at a pressure $P_5$. An inspection of FIG. 1 will disclose that a pressure differential of $P_2-P_5$ exists across the diaphragm assembly 74. (Pressure $P_5$ is communicated to chamber 78 by suitable conduit means 222 in communication with conduit 190.) In other words, the force tending to open the bypass valve 72 is directly related to the pressure difference across the governor metering restriction and temperature modifying valve 184.

Further, it can be seen that a pressure differential of $P_3 - P_2$ exists across pressure responsive diaphragm assembly 134. Accordingly, as pressure differential $P_3 - P_2$ increases and approaches the value of $P_1 - P_2$, as for example, by the increased rotational speed sense 56, a force is created across diaphragm assembly 134 tending to move governor valve 132 upwardly toward a more nearly fully closed position.

When the engine is being made ready for cranking, the power selector lever 156 is rotated to the desired power setting causing rotation of shaft 152 which, in turn, rotates cam 150 clockwise. Such rotation of cam 150 causes the contoured surface 224 to engage follower 148 and progressively urge lever 142 clockwise about pivot 144 thereby increasing the loading on spring 139 so as to urge diaphragm assembly 134 and governor valve 132 downwardly to provide a maximum effective flow area through orifice 162. As the engine 10 is being cranked, fuel pump 44 provides a supply of fuel through conduit 42 to chamber 40 at a pressure $P_2$, which increases in magnitude as the pump speed increases, so as to flow through orifice 162, conduits 164, 186 and 190. A conduit 226, formed in housing 36 effectively places conduit 190 in communication, as through suitable conduit means 228, with the burner 229. At this early stage of engine cranking or starting, the fuel pressure $P_2$ will be sufficient to cause diaphragm assembly 74 to move upwardly against the force transmitted by pushrod 94 thereby modulating the pressure differential of $P_2 - P_5$.

Once ignition is achieved, the engine compressor 20, compressor turbine 22 and power turbine 23 begin to accelerate to achieve the speed and/or power requested by the position of the power selector lever 156. As a consequence of the increase in speed, fuel flow from pump 44 is increased with attendant increases in pressures $P_1$, $P_2$ and $P_3$ within supply conduit 42 and chambers 40 and 138 respectively.

Accordingly, it can be seen that the pressure differential of $P_3 - P_2$ is increasing across diaphragm assembly 134 tending to overcome the force of spring 139 so as to urge governor valve 132 upwardly while, at the same time, the pressure differential $P_2 - P_5$, which is also increasing, is being applied across diaphragm assembly 74 tending to move bypass valve 72 upward in the opening direction.

Generally, compressor discharge pressure, $P_{t3}$, varies as the square of the speed of the compressor 20; the speed signal, $P_3 - P_2$, varies as the square of the speed being sensed; and the weight-rate of fuel flow, $W_f$, through orifice 162 varies as the square root of the pressure differential $P_2 - P_4$. It should also be pointed out that the flow-through the system established by restrictions 118 and 122 permits the changing of pressure $P_{t4}$ from one having a characteristic of varying as the square of the speed of the compressor to a lesser relationship, as, for example, approximating the square $(P_{t3})^2$ of the compressor discharge pressure, $P_{t3}$, permitting the ultimate relationship of fuel flow, $W_f$, to vary linearly with respect to compressor discharge pressure, $P_{t3}$. This can be expressed by the equations:

$$W_f = K_1 A \sqrt{P_2 - P_5}$$
$$P_2 - P_5 \cong K_2 (P_{t3})^2$$
$$W_f \cong K_1 K_2 A P_{t3}$$

Where:
$K_1$ = a constant
$K_2$ = a constant
$A$ = cross-sectional flow area determined by 162/160 and 198/200.

As engine speed (compressor speed) increases, pressure within respective chambers 90, 80, 40 and 138 also increases in accordance with the parameters governing such pressures. Accordingly, it can be seen that as compressor speed is increasing, speed sense differential pressure $P_3 - P_2$ causes the gradual upward movement of governor valve 132 when the force of spring 139 is overcome, thereby reducing the effective cross-sectional area of orifice 162. Due to the decreased cross-sectional area of orifice 162, the pressure differention $P_2 - P_4$ (and therefore the pressure differential $P_2 - P_5$) tends to increase, causing a greater upward force to be applied to bypass valve diaphragm assembly 74. Accordingly, when the differential $P_2 - P_5$ ($\Delta P_2$) increases to a predetermined value (for the conditions established) the resulting upward force on diaphragm assembly 74 equals, and then to a slight degree exceeds, the force transmitted by pushrod 94 so as to open bypass valve 72 in order to bypass fuel from chamber 40 and conduit 48 through conduit 52 to the inlet side of the fuel pump 44 as by conduit means 66, 68 and 70. Bypass valve 72 will be moved toward and away from the closed position in order to maintain the particular pressure differential $\Delta P_2$, so as to keep the engine operating at the governed steady state condition.

If it is now assumed that it is desired to increase the output of the engine from some first point of steady state operation to a second point of steady state operation, the only thing that needs to be done is to rotate the power selector lever 156 further to the right in order to cause an additional incremental clockwise rotation of shaft 152 and cam 150 so as to have the cam surface 224 further depress end 146 of lever 142. This, in turn, causes a greater loading on spring 139 and diaphragm assembly 134 to the point that the force created by pressure differential $P_3 - P_2$ ($\Delta P_3$) is over come, thereby moving governor valve 132 downwardly and increasing the effective flow area of orifice 162.

As a consequence, increased fuel flow to the engine is achieved resulting in increases in the compressor sped, compressor discharge pressure, $P_{t3}$, pressure, $P_{t4}$, and speed sense differential pressure $P_3 - P_2$. The increase in $P_{t4}$ causes diaphragm assembly 86 to exert a further force on pushrod 94 against diaphragm assembly 74 so as to tend to close the bypass valve 72 and maintain $P_2 - P_5$ ($\Delta P_2$) in proportion to $P_{t4}$. Accordingly, as before, when pressure differential $P_3 - P_2$ increases sufficiently, governor valve 132 is moved upwardly an amount sufficient to meter the desired weight rate of fuel flow and bypass valve 72 is moved upwardly so as to maintain the desired $\Delta P_1$ across the metering orifice 162.

For a controlled deceleration, the power selector lever 156 is rotated to a lower counterclockwise position thereby permitting end 146 of lever 142 to move to its upper-most position. This reduces the load on spring 139 and permits $P_3 - P_2$ to move governor valve 132 to its upper-most position so as to, for example, engage the minimum fuel flow abutment or stop 166.

In view of the preceeding, it should also be apparent that speed sense 56 provides an overrun protection. That is, if for some reason the load, as experienced by shaft 31, was suddenly removed, the engine would tend to overspeed and depending on the magnitude of the lost load, such overspeed could be critical. Accordingly, it can be seen that any such tendency to overspeed is sensed by speed sense 56, which, in turn, creates a related increase in the differential pressure $P_3 - P_2$ so as to move the governor valve upwardly thereby reducing the fuel flow so as to prevent an otherwise uncontrolled overspeed. Further, it should be apparent that the temperature probe 180 and associated valving assembly 184 function to define an area wherein a family of generally linear fuel-flow-to-compressor-discharge-pressure schedule will exist depending upon the then particular temperature sensed by the probe 180.

The acceleration system, comprised generally of bypass valve 72, diaphragm assemblies 74, 86, pushrod 94 and restrictions 118, 122 provides an arrangement where only very slight movements are necessary in order to control the opening and closing of the bypass valve 72. It can be seen that the force created by $P_{t4}$ acting on diaphragm assembly 86 is transmitted to the bypass valve 72 by the solid pushrod or force transmitting member 94. Since bypass valve motion is very slight, total motion of diaphragm assembly 86 is relatively insignificant and therefore friction effects on the pushrod 94, as by the seal 93, are negligible.

It will be noted, in FIG. 1, that chamber 90, within housing portion 88, has a first branch conduit 230, in communication therewith, with a resiliently biased valve member 232 seated against and closing the other end of conduit 230. Spring 234 may be adjustably preloaded by the adjustable spring seat 236. As can be seen, when a predetermined value of $P_{t4}$ is attained (or exceeded) valve 232 is moved off its cooperating seat thereby venting such excess pressure through conduit 230 and conduit 238 to conduit 120 at a point downstream of restriction 122. Therefore, it can be seen that a maximum value of $P_2 - P_5$, and therefore fuel flow, for a given temperature as sensed by probe 180, is limited or determined by the relief valve 232 preloaded to open at a desired value of $P_{t4}$.

As was previously stated, it has been determined that the efficiency of a turbine engine is greatly increased if the $T_4$ temperature of the engine can be maintained within prescribed limits (such limits being determined by the characteristics of the particular engine being considered).

In the embodiment of FIG. 1, the $T_4$ temperature is sensed as by a suitable probe 240 situated generally between the burner section 229 and the compressor turbine wheel 22. Even though not specifically shown it should, nevertheless, be made clear that the probe 240 could be located between the compressor turbine 22 and free turbine 23 or downstream of the free turbine 23. The choice of such locations would again, primarily, be dictated by the particular characteristics of the turbine engine.

In any event, the probe 240 would be connected as by suitable means 242, through which the $T_4$ signal would be transmitted, to a control assembly 244 which, in turn, may be operatively connected, as by means 245, to suitable valving means 246 to which is supplied a suitable hydraulic fluid via conduit means 248 and pressurized by pump means 250. The pump means 250 is supplied by a reservoir 252 which has a return conduit 254 leading thereto from valve means 246. Additional conduit means 256 interconnects valve means 246 and the clutching mechanism 39 so to, in accordance with the dictates of control 244, direct either relatively high or low hydraulic pressure to the interior of clutching assembly 39.

OPERATION OF CLUTCH CONTROL ARRANGEMENT OF FIG. 1

The control 244 may, of course, be comprised of various components whether electrical, electro-mechanical, mechanical or hydraulic. Such will become apparent when reference is subsequently made to specific embodiments of such a control disclosed herein. However, the control or computer device 244, nevertheless, serves the function of receiving appropriate signals from selected operating parameters, in this instance, $T_4$ as measured between the burner 229 and gasifier turbine 22, and determining whether such signals are within the range of established limits and, if not, initiating corrective action.

For example, let it be assumed that temperature $T_4$ as sensed by probe 240 is at a value less than the desired minimum value. The computer or control 244 responds thereto by creating an appropriate output signal or signal transmitting means 245 causing valving means 246 to be actuated so as to direct relatively high pressure hydraulic fluid to clutch assembly 39, via conduit means 256, causing the clutch plates 43 and 47 to frictionally engage each other. Such clutching, in turn, results in a retarding force being applied to the gasifier section 18 via gear 51 and shaft extension 25. The retarding of the otherwise free rotation of the gasifier section 18 results in a reduction in the speed signal, $P_3 - P_2$, allowing valve 132 to move in a direction increasing fuel flow, which results in an increase in $T_4$. When the temperature $T_4$ finally achieves its prescribed desired limit, control 244 removes the previously applied signal to valve means 246 permitting the hydraulic pressure within clutching assembly 39 to be reduced to a value appropriate for the desired $T_4$ temperature.

EMBODIMENT OF FIG. 3

FIG. 3 illustrates one specific embodiment of structure for practicing the invention as disclosed by FIG. 1. In FIG. 3 the structure generally identified at 260 can be considered as comprising at least a portion of control 244 and including the valving means 246 of FIG. 1. Further, a suitable configuration of temperature probe assembly 240 is illustrated as comprising not only a temperature sensing portion 262 but also a valving portion or assembly 264 responsive thereto.

Referring in greater detail to the arrangement of FIG. 3, the valving assembly 264 is illustrated as being comprised of a housing 266 having an inlet conduit 268 and an outlet conduit 270 generally between which is situated a valve orifice and seat 272. A valve member 274, carried as at the end of a stem portion 276, is situated so as to vary the effective area of orifice 272 depending on the relative proximity of the valve member 274. Stem 276, provided with a shouldring like portion 278 slidably received within a cylindrical guide-way 280 formed in housing 266, has its opposite end operatively secured to one end of a temperature sensing rod 282 forming a portion of the temperature sensing section 262.

The temperature sensing section 262 is illustrated as comprising the rod 282 having its other end secured to an end cap member 284 which cooperates with a recessed portion of housing 266 to axially contain therebetween a second temperature sensing element member 286 of cylindrical configuration. Cylinder 286 and rod 276 have different coefficients of thermal expansion resulting in a predictable axial movement of valve member 274 per degree of temperature variation. The temperature probe 240 is also preferably provided with a protective shroud 288, which is perforated as at 290, in order to protect the rod 282 and cylinder 286 from possible damage. The entire assembly may be secured to the housing 14 of engine 10 by any suitable means such as the fastener and seal respectively illustrated at 292 and 294.

The structure 260 is illustrated as being comprised, generally, of housing sections 296 and 298 operatively secured to each other in a manner so as to contain therebetween a diaphragm 300, peripherally, in order to define at opposite sides thereof distinct but variable chambers 302 and 304. Suitable diaphragm backing members 306 and 308 effectively contain the diaphragm 300 therebetween and operatively connect it to a stem portion 310 of valving means 246.

Chamber 302 contains an evacuated spring-like bellows assembly 312 which has its opposite ends respectively fixedly secured to end wall 314 and to the diaphragm 300 or associated diaphragm backing plates 306 and 300. Chamber 302, by means of a conduit portion 316, communicates with a source fo compressor discharge pressure, $P_{c3}$, 112 as through conduit means 114 which, as shown, also communicates with the inlet conduit 268 of probe assembly housing 266. Chamber 304, in contrast, communicates via conduit means 320 with the outlet conduit 270 of housing 266. Suitable adjustment means 321 comprised of a branch conduit 322 communicating with conduit means 320 and a variably adjustable needle-like valve 324 may be provided for bleeding a desired amount of pressure within conduit means 320 to the atmosphere.

The valving means 246 is illustrated as being comprised of a hydraulically balanced spool-type valve having valving lands 326 and 328 joined by a portion 330 reduced cross-section and operatively connected to the stem 310. Oppositely disposed chambers 332 and 334 are vented via conduit portions 336 and 338 to sump as by conduit means 254 while conduit portion 340 is connected, via conduit means 248, to a source of hydraulic fluid under pressure such as pump 250. The outlet of the valving assembly 246 may be considered as forming a part of the conduit means 256 leading to the clutching means 39.

OPERATION OF THE EMBODIMENT OF FIG. 3

As previously stated, probe 240 senses $T_4$ temperature and, generally, causes the valve 274 to move away from its cooperating seat and aperture 272 as temperature $T_4$ increases.

For purposes of illustration let it be assumed that temperature $T_4$ is within the prescribed or desired limits. At this time compressor discharge pressure, $P_{t3}$, will continue to be directed, via conduit means 114 and 316 to chamber 302, exerting a downward pressure on diaphragm 300, and valve 274 will have moved some distance upward permitting a relatively unrestricted flow of compressor discharge pressure through orifice 272 and outlet 270. Since it is quite possible that some drop in pressure might occur, and for ease of reference the value of the pressure downstream of orifice 272 will be designated $P_{t5}$. Pressure $P_{t5}$ thusly is directed to chamber 304 where it is applied to the underside of diaphragm 300. (It should be evident that where a bleed arrangement, as illustrated by passage 322 and needle valve 324, is employed, the value of $P_{t5}$ will also be dependent upon the degree of bleed permitted thereby.)

At this time the upward force determined by the spring rate of bellows 312 and the force of $P_{t5}$ applied against the lower side of diaphragm 300 are in balance with the downward force against diaphragm 300 determined by the pressure $P_{t3}$ within chamber 302. Accordingly, since the structure 260 is in balance, the appropriate hydraulic pressure is directed via conduit means 256 to the clutching mechanism 39.

However, if the temperature $T_4$ should for some reason decrease to a value less than the preseribed limits, valve 274 will be moved toward or against its cooperating orifice and seat 272 causing a reduction in effective flow area of said orifice 272. This, in turn, causes a greater pressure drop thereacross resulting in a decrease in the value of $P_{t5}$. Since the structure 260 was previously in balance, the reduction in the value of $P_{t5}$ now causes the diaphragm or pressure responsive means 300 to move downwardly resulting in valve land 328 further opening communication between high pressure hydraulic inlet 340 and conduit means 256 leading to the clutching means 39. As previously explained, this has a retarding effect on the compressor turbine 22 which results in an increase in temperature $T_4$. This retarding effect continues until $T_4$ is again within desired limits at which time the system returns to a balanced condition as shown.

The provision of the evacuated bellows 312, as will become apparent to those skilled in the art in view of the teachings herein, provides automatic altitude compensation for those situations wherein the apparatus may be used in varying altitudes.

EMBODIMENT OF FIG. 4

FIG. 4, in which elements like or similar to those of FIG. 3 are identified with like reference numbers, discloses structure which may be considered as a modification of the arrangement of FIG. 3.

The embodiment of FIG. 4 would function in the same manner as that of FIG. 3 with the exception that additional variable but distinct chambers 340 and 342 are defined on opposite sides of a pressure developing member or diaphragm 344 peripherally retained as between housing portions 296 and 346. Diaphragm backing members 348 and 350 operatively connect diaphragm 344 to an actuating rod or stem 352 which may have its end 354 disposed for engagement by suitable actuating means 356 (which may take the form of a cam member) operatively connected and responsive to the movement of the power selector lever 156 in the power increasing direction. Chamber 340 may be vented to the atmosphere as by conduit 358 while chamber 342 is placed in communication with chamber 304 by virtue of conduit means 360.

The purpose of the diaphragm 344 and associated actuating mechanism can best be understood if it is first assumed that $T_4$ is within the prescribed limits by virtue of some communication between high pressure in inlet 340 and in conduit means 256 past valve land 328.

If during this condition of operation an increase in power is desired, it is best to remove all retarding effect from the gasifier section 18 in order to thereby enable the compressor 20 and compressor turbine 22 to accelerate as quickly as possible. Accordingly, when the power selector lever 156 is rotated in the power-increasing direction, the actuating means 356 causes a downward movement of stem 352 and diaphragm 344. This displacement of diaphragm 344, along with the restriction means 362, causes a sudden increase in the pressure of $P_{t5}$ within chamber 342, conduit 360 and chamber 304 resulting in diaphragm 300 being at least temporarily moved upwardly, moving valve land 328 with it, thereby venting the conduit means 256 and interior of clutching mechanism 39 to low or sump pressure.

EMBODIMENT OF FIG. 5

All elements in FIG. 5 which are like or similar to those of either FIGS. 3 or 4 are identified with like reference numbers. Basically, the differences reside in the elimination of the altitude compensating bellows means 312 of FIGS. 3 and 4, and the use of a biasing spring 364 situated on a spring perch 366 through which an aperture 368, equivalent to conduit 360, is formed. Another basic difference is the use of a movable wall, in the form of a diaphragm 370 peripherally secured between housing sections 296 and 296a while being suitably connected at its midportion to stem 310 as by opposed backing plates 372 and 374, one of which could well be a flange formed on the stem 310.

Figures 7, 8:
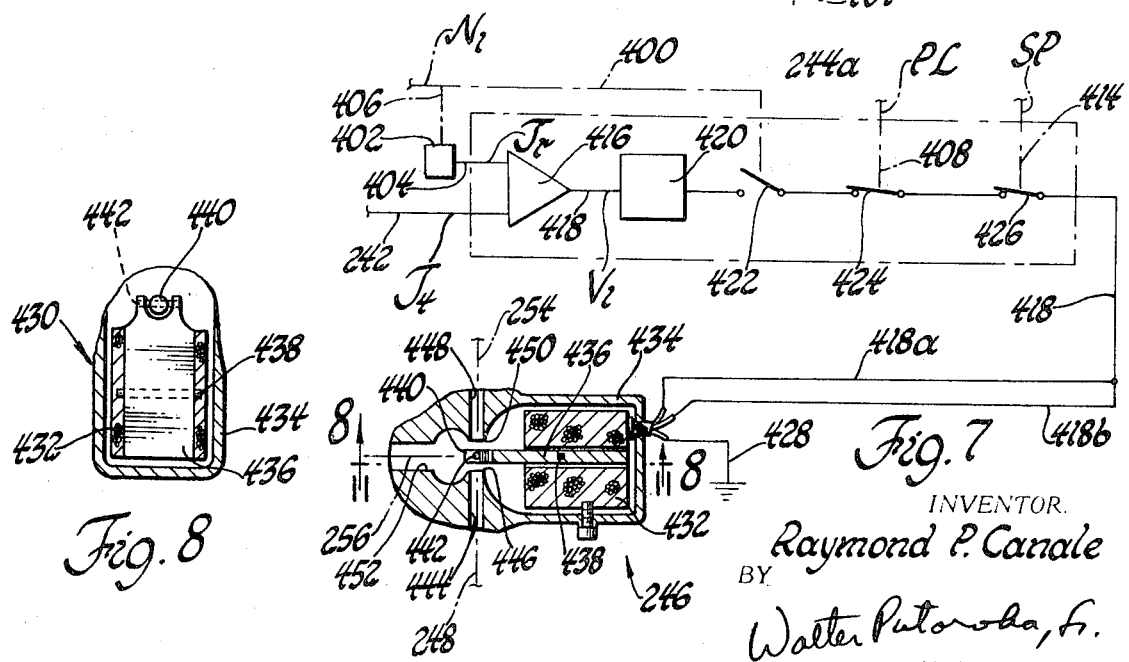
FIG. 7 is a partially diagrammatic view of a portion of the invention shown in FIG. 6.
FIG. 8 is a cross-sectional view taken generally on the plane of line 8—8 of FIG. 7.

EMBODIMENT OF FIGS. 6, 7 and 8

FIG. 6 illustrates another embodiment of the invention wherein elements like or similar to those of the preceding Figures are identified with like reference numbers. In the arrangement shown, probe 240a may be a thermocouple for supplying a variable signal $T_4$ via signal transmission means 242 to the computer or control 244a which may be comprised of suitable logic and control elements as, for example, electrical circuitry as is well known in the art.

The computer 244a may also receive other input signals such as a speed signal, $N_1$, produced by the speed sensitive means 62, 62 in accordance with the speed of gasifier 18, and applied to computer 244a via signal transmitting means 400. A second temperature signal, $T_R$, which is a low reference temperature against which $T_4$ is compared, may be produced as by suitable potentiometer means 402 and directed to computer 244a via signal transmitting means 404. As shown the signal $N_1$ may be also transmitted as via means 406 so as to be applied to the potentiometer means 402 in order to at times modify the value of the $T_R$ signal produced thereby. That is, in certain situations it has been determined that a first predetermined minimum temperature of $T_4$ is desired for gasifier speeds of, for example, up to and including 60 percent of its rated maximum speed, while an increasing minimum temperature related to the increase in gasifier speed. Accordingly, this may be accomplished by providing the potentiometer means 402 to be acted upon by the signal, $N_1$, when the signal $N_1$ exceeds a value indicative of said 60 percent gasifier speed, so as to thereby continually adjust the potentiometer means 402 in order to progressively increase the value of the reference signal $T_R$.

As was previously described, it is desireable to prevent the application of a retarding force on the gasifier section 18, through the clutching means 39, whenever the engine 10 experiences a request for additional power. Accordingly, suitable means 356a operatively connected to the power lever 156 functions to create a suitable PL signal and apply it via means 408 to the computer or control 244a.

Further, it is also desirable, when a variable ratio power transmission assembly 33 is employed, to also prevent the application of a retarding effect on the gasifier section 18 whenever the transmission assembly 33 experiences a shift point. This is diagrammatically illustrated by a lever 410 operatively connected to suitable signal generating means 412 adapted for applying a generated signal, SP, to computer 244A, via signal transmitting means 414, whenever the transmission 33 experiences a shift point.

FIG. 7 further illustrates, diagrammatically the computer or control section 244a of FIG. 6 as being comprised of an electrical differential amplifier 416 which receives signals $T_4$ and $T_R$, along means 242 and 404, respectively. An output signal $V_1$ is in turn created and applied as to a conductor 418 which may, in turn, have suitable current limiter means 420 as well as suitable switching means 422, 424 and 426 in series therewith.

In this arrangement switch means 422 could be normally open and controlled by signal transmitting means 400 so as to thereby become closed at some predetermined gasifier speed as, for example, possibly 60 percent of its rated speed and remain closed for all gasifier speeds in excess thereof. Switch means 424 could be normally closed and operatively controlled by the signal transmitting means 408 so as to become opened whenever the signal, PL, appeared thereon. Similarly, switch means 426 could be normally closed and operatively controlled by the signal transmitting means 414 so as to become opened whenever the signal, SP, appeared thereon.

A torque motor assembly 430 comprised as of a field winding 432, which may be comprised of oppositely wound field coil each having an end connected to ground via conductor 428 and having their respective other ends connected to conductor 418 by means of parallel conductors 418a and 148b, situated within a suitable housing 434 which also contains an armature member 436 suitably anchored as by a torsion type spring 438. The end of the armature 436 has a valve member 440 secured thereto as by a pivot pin 442. A passageway 444 formed in the housing 434 communicates with a source of relatively high hydraulic pressure, as via conduit means 248, and has an open end 446 generally juxtaposed to valve 440. A second passageway 448 formed in housing 434 communicates with sump pressure, as by conduit means 254, and has an open end 450 generally juxtaposed to the opposite side of valve 440. A second passageway 448 formed in housing 434 communicates with sump pressure, as by conduit means 254, and has an open end 450 generally juxtaposed to the opposite side of valve 440. A third passageway 452 formed in housing 434 communicates with the clutching means 39 as by conduit means 256.

During normal operation the torsion spring 438 in a generally null position as illustrated. However, should the signal $T_4$ exceed the reference signal $T_R$, the output signal $V_1$ will have a (+) value causing the field 432 to be energized in a direction causing armature 436 to rotate counter-clockwise, about the axis of torsion spring 438, resulting in valve 440 more closely approaching (possibly closing off) the open end 446 of high pressure supply conduit 444. Consequently, this causes the sump pressure of conduit 448 to be more fully communicated to the clutching assembly 39 by means of conduit means 452 and 256.

Similarly, if reference signal $T_R$ should exceed the value of signal $T_4$, the output signal $V_1$ will have a (−) value causing the field 432 to be energized in a direction causing armature 436 to rotate clockwise, about the axis of torsion spring 438, resulting in valve 440 more closely approaching (possibly closing off) the open end 450 of sump pressure conduit 448. Consequently, this causes the high pressure of conduit 444 to be more fully communicated to the clutching assembly 39 as by conduit means 452 and 256. Accordingly, it can be seen that the invention as herein disclosed provides various arrangements defining a closed loop temperature control system applicable to various forms of turbine engines as well as providing for the accommodation of various overriding or corrective signals.

It should also be noted that a signal indicative of the speed of shaft 24 or shaft 31 is compared to a desired maximum value, and, when the desired maximum value is exceeded, control 244 (FIG. 1) or control 244a (FIG. 6) commands high pressure to clutch 39, hereby producing a non-slipping connection of free turbine section 19 to gasifier section 18. This causes the gasifier section to tend to overspeed, which causes the governor valve 132 to move in a direction decreasing fuel flow. The result is insufficient power to drive compressor 20, which then constitutes a load on the free turbine section 19, retarding its rotational speed and preventing overspeed thereof. Such an arrangement could be comprised of suitable speed responsive means 460 operatively connected to shaft 31 as by means 462 so as to produce a signal on transmission means 464 leading to the control valve 246 whereby, upon the occurrence of such an overspeed signal, control valve 246 can be made to supply full high pressure to the clutch assembly 39.

Although only selected embodiments of the invention have been disclosed and described, it should be apparent that other embodiments and modifications of the invention are possible within the scope of the appended claims.

I claim:

1. A cycle temperature control system for a turbine engine having a gasifier section comprised of a compressor and a compressor turbine driving said compressor and a free power turbine operatively connected to power output transmitting means, comprising first means for sensing a selected cycle temperature within said turbine engine for producing a first signal of a variable magnitude in accordance with the magnitude of said cycle temperature, second means effective to at times at least partially retard the speed of said compressor and compressor turbine, and third control means for receiving said first signal, said third control means being effective whenever the magnitude of said first signal is less than a first predetermined magnitude to cause actuation of said second means in order to retard the speed of said compressor and compressor turbine, said second means comprising motion transmitting means operatively interconnecting said power turbine and said compressor whereby upon actuation of said second means said second means is effective to retard the speed of said compressor by transmitting at least some of the rotational energy of said compressor through said power output transmitting means operatively connected to said free power turbine.

2. A cycle temperature control system according to claim 1, including fourth means effective for producing a second signal whenever said power output transmission means is caused to experience a shift point, said third control means being effective to receive said second signal and in response thereto being rendered ineffective for causing said actuation of said second means, and including fifth means effective for producing a third signal whenever an increase of power is requested of said engine, said third control means being effective to receive said third signal and in response thereto being rendered ineffective for causing said actuation of said second means.

3. A cycle temperature control system according to claim 1, including fourth means effective for producing a second signal whenever said power output transmission means is caused to experience a shift point, said third control means being effective to receive said second signal and in response thereto being rendered ineffective for causing said actuation of said second means, fifth means effective for producing a third signal whenever an increase of power is requested of said engine, said third control means being effective to receive said third signal and in response thereto being rendered ineffective for causing said actuation of said second means, and sixth means responsive to rotational speed of said gasifier section and effective for producing a fourth signal generally in accordance therewith, said third control means being effective to receive said fourth signal and in response thereto being rendered ineffective for causing said actuation of said second means whenever said rotational speed of said gasifier section is less than a predetermined minimum rotational speed.

4. A cycle temperature control system according to claim 1, wherein said motion transmitting means comprises clutch means, wherein said third control means comprises valving means operatively connected to moveable pressure responsive means exposed on one side to the discharge pressure of said compressor and exposed on an other side opposite to said one side to a second pressure which is derived from said compressor discharge pressure, wherein said first means comprises a temperature sensing probe operatively connected to associated second valving means, said probe being effective to control the position of said second valving means in accordance with said cycle temperature in order to vary the magnitude of said second pressure on said other side of said pressure responsive means.

5. A cycle temperature control system according to claim 4, wherein said moveable pressure responsive means is operatively connected to third valving means communicating generally between a source of relatively high pressure actuatingfluid and said clutch means, said third valving means being effective to complete communication between said source and said clutch means whenever the magnitude of said secondpressure on said other side of said pressure responsive means has been sufficiently reduced by said probe and associated second valving means.

6. A cycle temperature control system according to claim 4, including compensating means operatively connected to said pressure responsive means for automatically providing a compensating force thereagainst for variations occurring in barometric pressure, said compensating means comprising resilient barometrically deflectable means continually resiliently urging said pressure responsive means in the direction of said second pressure.

7. A cycle temperature control system according to claim 4, including moveable volumetric displacement means forming a wall of a chamber, wherein said other side of said pressure responsive means and said chamber are exposed to said second pressure, said volumetric displacement means being adapted to be moved whenever increased power is requested of said engine, said displacement means being effective upon being so moved to temporarily cause an increase in the magnitude of said second pressure on said other side of said pressure responsive means, thereby moving said pressure responsive means in the direction of and against said compressor discharge pressure.

8. A cycle temperature control system according to claim 7, including spring means operatively connected to said pressure responsive means, said spring means normally urging said pressure responsive means in a direction opposite to said other side of said pressure responsive means.

9. A cycle temperature control system according to claim 1, wherein said second means also comprises clutch means, wherein said third control means comprises electrical computer means, wherein said first means comprises a temperature sensing probe responsive to the temperature of the gas within said gasifier section immediately upstream of said compressor turbine, said probe being effective for producing and directing said first signal to said computer means, including temperature reference means effective for producing a second signal of a magnitude reflective of a predetermined reference temperature and for directing said second signal to said computer means, said computer means comprising comparator amplifier means for comparing the magnitudes of said first and second signals and creating an output signal indicative of the difference therebetween, and wherein said second means is adapted to be responsive to said output signal and in accordance therewith be actuated or de-actuated in order to retard or release said compressor and compressor turbine.

10. A cycle temperature control system according to claim 9, including magnetically controlled valving means interposed generally between said second means and source of relatively high pressure actuating fluid, said magnetically controlled valving means being adapted to receive said output signal and be openable and closeable in response thereto in order to thereby be effective for causing selective clutching and de-clutching of said clutching means.

11. A cycle temperature control system according to claim 9, including means operatively connected to said temperature reference means and responsive to rotational speed of said compressor and compressor turbine, sand means responsive to the rotational speed of said compressor and compressor turbine being effective to variably adjust said temperature reference means in order to increase the magnitude of said predetermined reference temperature as the rotational speed of said compressor and compressor turbine increases.

12. A cycle temperature control system for a turbine engine, comprising first means for sensing a selected cycle temperature within said turbine engine and for producing a first signal of a variable magnitude in accordance with the magnitude of said cycle temperature, second means effective to at times at least partially retard the speed of said engine, and third control means for receiving said first signal, said third control means being effective whenever the magnitude of said first signal is less than a first predetermined magnitude to cause actuation of said second means in order to retard the speed of said engine, power output transmission means operatively connected to said turbine engine, and fourth means effective for producing a second signal whenever said transmission means is caused to experience a shift point, said third control means being effective to receive said second signal and in response thereto being rendered ineffective for causing said actuation of said second means.

13. A cycle temperature control system for a turbine engine having a gasifier section comprised of a compressor and a compressor turbine and a power turbine freely rotatable with respect to said compressor and compressor turbine, comprising first means for sensing a selected cycle temperature within said turbine engine and for producing a first signal of a variable magnitude in accordance with the magnitude of said cycle temperature, second means effective to at times operatively engage said compressor and compressor turbine in order to at least partially retard the rotation of said compressor and compressor turbine, third control means for receiving said first signal, said third control means being effective whenever the magnitude of said first signal is less than a first predetermined magnitude to cause actuation of said second means in order to retard rotation of said compressor and compressor turbine, and fourth means effective for producing a second signal whenever the speed of rotation of said power turbine exceeds a predetermined rotational speed, said third control means being effective to receive said second signal and in response thereto being effective to cause said power turbine and said gasifier section to be completely locked for rotation with each other.

* * * * *